United States Patent [19]

Kansupada et al.

[11] Patent Number: 5,872,178
[45] Date of Patent: Feb. 16, 1999

[54] TIRE WITH COATED SILICA REINFORCED RUBBER TREAD

[75] Inventors: Bharat Kanchanlal Kansupada, Mogadore; Michael Julian Crawford, Akron, both of Ohio

[73] Assignee: The Goodyear Tire & Rubber Company, Akron, Ohio

[21] Appl. No.: 839,244

[22] Filed: Apr. 15, 1997

Related U.S. Application Data

[63] Continuation of Ser. No. 464,165, Jun. 5, 1995, abandoned.
[51] Int. Cl.⁶ .............................. C08K 3/04; B60C 19/08
[52] U.S. Cl. ................. 524/496; 152/209 R; 152/152.1; 156/96; 427/393.5
[58] Field of Search .................................. 156/96, 128.1, 156/404, 127, 128.6; 152/564; 427/393.5; 524/496

[56] References Cited

U.S. PATENT DOCUMENTS

| | | | |
|---|---|---|---|
| 4,329,265 | 5/1982 | Hallenbeck | 524/496 |
| 4,857,397 | 8/1989 | Mowdood et al. | 524/496 |

*Primary Examiner*—James J. Seidleck
*Assistant Examiner*—Olga Asinovsky
*Attorney, Agent, or Firm*—Henry C. Young, Jr.

[57] ABSTRACT

The invention relates to a rubber tire with carbon black reinforced carcass and quantitatively silica reinforced rubber tread, said tread having a thin overcoat thereon of rubber containing a quantitative amount of electrically conductive carbon black, a coating composition therefor and a method of application.

2 Claims, No Drawings

TIRE WITH COATED SILICA REINFORCED RUBBER TREAD

This is a Continuation of application Ser. No. 08/464,165, filed on Jun. 5, 1995, now abandoned.

FIELD

The invention relates to a rubber tire with carbon black reinforced carcass and quantitatively silica reinforced rubber tread, said tread having a thin overcoat thereon of rubber containing a quantitative amount of electrically conductive carbon black, a coating composition therefor and a method of application.

In one aspect, the invention relates to a rubber tire with sulfur vulcanized, carbon black reinforced carcass and sulfur vulcanized tread of a cap/base construction, and particularly a cap/base-wing construction in which the tread cap is quantitatively reinforced with silica and the underlying base, or base-wing which extends over a portion of the carcass, is carbon black reinforced wherein said tread cap has a thin rubber coating on at least a portion of its outer surface which extends over at least a portion of an outer surface of said base or base-wing adjuxtapositioned to the tread cap, where said rubber coating contains a quantitative amount of electrically conductive carbon black and is sulfur-covulcanized with said tread cap and base or base-wing.

In a further aspect, the invention relates to the preparation and composition of a water based coating composition therefor and an associated process of coating such a tire tread

BACKGROUND

Pneumatic rubber tires are conventionally prepared with a rubber tread which can be a blend of various rubbers, typically sulfur curable, diene-based elastomers. The tire rubber, including its tread portion, is typically reinforced with carbon black reinforcing filler.

For the purposes of this presentation, a tire is viewed as being composed of a circumferential tread and supporting carcass therefor. The carcass is viewed as being composed of relatively conventional elements which include but are not limited to sidewalls, beads, innerliner and the supporting carcass plies, including fabric reinforced plies. A shoulder region of a tire is considered as being a portion of the tire where its sidewall meets its tread. It is not normally a sharp line of demarkation and its actual position may vary somewhat from tire to tire. The bead portion of the carcass is typically composed of a relatively inextensible bundle of wires which is encased in carbon black reinforced rubber and is designed to contact a metal rim on which the tire itself is mounted to form a tire/rim, or tire/wheel, assembly which itself conventionally adapted to be mounted on a vehicle. The rim is typically steel or aluminum, or alloy thereof, and is thus electrically conductive since the metal is considered as having a very low resistance to flow of electricity. The term metal as used herein for the metal rim is intended to be electrically conductive metals such as the aforesaid steel and aluminum rims as would be understood by those having skill in such art.

It is acknowledged that, in some tire constructions, carbon black reinforced rubber components such as for example chippers and chaffers may be positioned in the bead area of the tire construction to assist in cushioning the bead component against the metal rim. In the context of this description, a reference to the aforesaid bead component of the tire carcass is intended to include such other rubber components unless otherwise indicated.

In practice, air pressure is applied to the cavity enveloped by the metal rim and the pneumatic tire carcass.

Such construction elements, or components, of a pneumatic tire and tire carcass, as well as such tire/wheel or tire/rim assembly, are well known to those familiar with such tire art.

Rubber by itself is generally considered as being a substantial electrical insulator or, in other words, a rather poor conductor of electricity.

A carbon black reinforced rubber vehicular tire, while still providing a degree of resistance to flow of electricity, has a considerably higher electrical conductivity, or lower resistance to flow of electricity, than rubber without the carbon black reinforcement.

It is considered herein that a continuous electrical dissipation path is created between the electrically conductive metal rim of a tire/wheel (tire/rim) assembly to the to the ground via the carbon black reinforced rubber of the tire, including its ground-contacting tread component, for such a tire/rim assembly mounted on a vehicle which is intended to travel over the ground.

In this manner, it is considered herein that potential electrical energy which may be created by components of or within a moving vehicle as its tires, or tire/wheel assemblies, are rotating and traveling over the ground, is dissipated from the rim of a tire/rim assembly to the ground via the carbon black reinforced rubber path of the tire carcass and tread, which is understood herein to be primarily the outer rubber surface of the tire.

Thus, in one aspect, it is considered herein that the carbon black reinforced rubber of the tire carcass and associated tread normally provide a continuous path to dissipate electrical energy and thereby retard or eliminate static electrical charge from building up and/or accumulating under dynamic conditions of a rotating tire on a vehicle traveling across the ground.

While most carbon blacks are electrically conductive to some degree, some carbon blacks are more electrically conductive than others and are often referred as being electrically conductive carbon blacks. It is understood or believed that such electrically conductive carbon blacks are sometimes used with various industrial products where electrical conductivity is a factor in their utility. However, insofar as it is known, such electrically conductive carbon blacks are not used for commercially manufactured carbon black-reinforced rubber tire treads primarily because such classified electrically conductive carbon blacks are not normally considered the best rubber reinforcing carbon blacks for rubber tire treads.

For the purposes of this invention, electrically conductive carbon blacks are those which, when blended in amount of 50 phr with a diene-based elastomer such as, for example emulsion polymerization prepared styrene/butadiene copolymer, and the resulting mixture sulfur cured, provide a composition demonstrating a surface electrical resistance of 10,000 ohms or less according to ASTM D257-66, Mod G, as hereinafter described.

In one aspect, carbon black reinforced rubber tires may sometimes be prepared which have outer rubber treads designed to be ground contacting which are quantitatively reinforced with silica and thus contain only minimal amounts such as for example 10 phr or less of carbon black.

In such silica reinforced tire tread construction, although the various other rubber components of the tire, namely the aforesaid tire carcass, are quantitatively reinforced with carbon black and thus have a degree of electrical conductivity, the silica reinforced tread itself has a substantially lower electrical conductivity, or in other words a substantially higher electrical resistance and thus create a degree of electrical insulating effect between the tire carcass and ground. Such a tire construction has a substantially less tendency to dissipate static electricity from the tire to the ground, and particularly from the metal rim of a tire/rim assembly to the outer surface of the tire tread and thence to the ground, which may be generated by a dynamic condition of the rotation of the tire on a moving vehicle. Accordingly, a potential for static electricity to build up, or increase, is considered to be higher for such a tire construction than for a similar tire with a carbon black reinforced tread.

Therefore, it is desirable to provide a designed path for electrical leakage or static electricity dissipation for such a tire having a quantitative silica reinforced rubber tread and minimal, if any, carbon black reinforcement.

It acknowledged that it might be thought of to apply a coating of carbon black-containing rubber composition over the outer surface of the silica reinforced rubber tread to facilitate an electrical leakage or dissipation path connecting the tire's carbon black reinforced rubber sidewall region to the ground as the tire rotates on the vehicle. Indeed, elastomer/carbon black coatings, which may be applied as either water-based or organic solvent-based compositions and which are sometimes called pre-cure paints, are often applied to various surfaces of green, or unvulcanized, tire constructions before the tire is vulcanized. A purpose for such pre-cure paints is to reduce friction between the tire and its associated vulcanization mold and increase air bleed between the tire and mold during the vulcanization operation. For example, see U.S. Pat. Nos. 4,857,397 and 4,329,265.

However, it is recognized that a thin outer rubber coating, if applied to a tire tread surface, will relatively quickly wear away as the tire is used, leaving the coating on surfaces within the grooves in a tire tread which has a lug/groove configuration. Thereby, it is considered herein that only a very small portion of the coating on the walls of the tire tread grooves is actually available to be directly presented to, or contact, the ground to facilitate electrical dissipation from the tire to the ground.

It is, therefore, considered herein that in order to be practical, such a thin carbon black-containing rubber coating must be very highly electrically conductive for purposes of dissipating electrical charge from the walls of silica reinforced rubber tire tread grooves to the ground without relying upon a coating on the outer surface of the tire lugs itself.

While the dissipation of generated electrical energy may not be completely understood, it is believed that the electricity is transmitted primarily on the surface of the carbon black reinforced rubber surface of the tire carcass and aforesaid coating from the steel rim to the ground.

It is highly desirable for such a coating to be applied as a water based, film forming carbon black containing rubber composition. By desiring that the film coating be film forming in nature as it is applied to the rubber surface, it is envisioned that it forms a substantially continuous film on the tread surface and ultimately the surfaces of the grooves therein. It is also desirable that the coating adequately adheres to the tire tread surface, ultimately its groove walls.

However, it is a particular challenge to formulate a water based rubber composition composed of a blend of rubber latex and water dispersion of electrically conductive carbon black which will, after coating onto an unvulcanized rubber composition, dry within an acceptable period time to be practical in a commercial manufacturing circumstance. Commercial electrically conductive carbon black water dispersions are understood to be conventionally supplied in concentrations on an order of 20 to 25 weight percent of carbon black. Most synthetic rubber latices are commercially provided, for example, in elastomer concentrations on an order of about 40–43 weight percent for polybutadiene rubber and about 40 to about 50 weight percent for styrene/butadiene copolymers elastomers. Natural rubber might be provided as a latex with about 65 to 70 percent rubber. It is considered herein that a blending of such aforesaid relatively dilute electrically conductive carbon black dispersion with such aforesaid synthetic latices would be expected to yield a water mixture that is too dilute and therefore contain too much water to be highly practical for commercial tire manufacturing practices where relatively short drying times for the coating are desired unless the composition is applied to a hot rubber surface and/or external heat is applied to the coating after it is coated onto the rubber surface.

In one aspect, for a tire tread conventionally configured with a combination of lugs and grooves, it is desired that the grooves communicate with the carbon black reinforced rubber shoulder of the tire, the area of the tire where the sidewall and tread meet, in order for the coating to communicate with the carbon black reinforced rubber portion of the tire, namely the tire carcass and the tread base in a tread cap/base construction.

In a tire tread cap/base construction which is well known to those having skill in such art, and for the purposes of this invention, it is envisioned that the cap is substantially silica reinforced and its base is substantially carbon black reinforced.

It is, therefore, desirable that the rubber coating (i) contains a quantitative amount of electrically conductive carbon black for dissipation of electrical energy under the aforesaid conditions (ii) is covulcanized with the rubber tire tread in order that it be integral with the tread and the walls of grooves of a tire tread configuration composed of lugs and grooves (iii) be extremely thin so that it does not appreciably increase the volume of the tire and does not appreciably affect the tread properties of the tread and (iv) be applicable as a water based composition with a suitably short drying time in order to be practical in a manufacturing process.

For the rubber coat to contain a quantitative amount of electrically conductive carbon black, it is considered herein that it means that the coating should contain a sufficient amount of the carbon black to suitably dissipate an electrical charge although it is believed that too high of a carbon black concentration in the rubber coat would cause the coat to excessively crack on the rubber surface and thus interfere with a continuous coating film aspect. In practice, it is also considered herein that the thinness of the coating is important to not add to the volume of the tire in its vulcanization mold and to not detract appreciably from the tire's tread properties. Indeed, in one aspect, it is expected that the film will wear off of the outer surface of tire tread lugs during use of the tire.

In order for such a coating to be successfully water based, it is considered herein that the coating composition should be composed of a blend of (i) one or more of aqueous rubber emulsions having a basic pH selected from emulsion polymerization prepared synthetic rubber(s) and natural rubber latex and (ii) a water dispersion of carbon black having a basic pH. It is considered herein that the basic pH would normally be expected for the aforesaid synthetic and natural rubber emulsions and is highly desirable and perhaps necessary for the carbon black dispersion in order that an addition of the carbon black dispersion to the latex not pre-precipitate or cause a coagulation of the rubber from the emulsion.

It is also desired that the water based coating composition wet the surface of the rubber to be coated and form a continuous film thereon upon drying. For such purpose it is understood that one or more wetting agents and perhaps a thickening agent, defoamer, preservative and biocide might be added to the basic coating composition.

As used herein, the terms "quantitatively reinforced with silica", "quantitative silica reinforced rubber" and the like which may be used in conjunction with rubber tire treads refer to such rubber treads which contain silica in a range of about 40 to about 90 phr and, optionally, carbon black reinforcing filler in an amount of up to about 10 phr.

The term "phr" as used herein, and according to conventional practice, refers to "parts of a respective material per 100 parts by weight of rubber".

SUMMARY AND PRACTICE OF THE INVENTION

In accordance with this invention, a water-based rubber composition is provided which comprises a blend of (A) at least one latex selected from aqueous emulsion polymerization prepared styrene/butadiene copolymer rubber latex, emulsion polymerization prepared polybutadiene latex and natural cis 1,4-polyisoprene latex, and (B) an aqueous dispersion of electrically conductive carbon black, wherein said carbon black is present therein in an amount of about 25 to about 200, preferably about 40 to about 100, phr and where said rubber/carbon black composition, when dried and sulfur cured, is characterized by having a surface resistivity of less than about 10,000 ohms according to ASTM Test D257-66, Mod. G.

In practice, and in one aspect, the water-based rubber composition may comprise a blend of (A) of at least one aqueous styrene/butadiene copolymer rubber latex having a pH in a range of about 8.5 to about 12.5 and a rubber concentration of about 50 to about 75, sometimes preferably about 65 to about 75, percent therein and bound styrene in the rubber of about 23 to about 35 percent and a natural cis 1,4-polyisoprene rubber latex with a pH in a range of about 9 to about 11 and a rubber concentration of about 50 to about 70 weight percent therein, and, optionally, an additional emulsion polymerization prepared polybutadiene latex having a pH in a range of about 8 to about 10 and a rubber concentration in a range of about 40 to about 60 weight percent therein, and (B) an aqueous dispersion of electrically conductive carbon black having a pH in a range of about 8 to about 10 with a carbon black dispersion of about 20 to about 30 weight percent therein, wherein said carbon black is present in an amount of about 25 to about 200, preferably about 40 to about 100, phr and where said rubber/carbon black composition, when dried and sulfur cured, is characterized by having a surface resistivity of less than about 10,000 ohms according to ASTM Test D257-66, Mod. G.

It is considered herein that an important and significant essence of this invention is the creation and application to a silica reinforced rubber tire tread of a water based coating composition comprised of (i) a rubber latex and (ii) a water dispersion of an electrically conductive carbon black.

While it is recognized that pre-cure coatings composed of organic solvent, and sometimes water based, blends of rubber and carbon black have been applied to unvulcanized tire surfaces for many years, it is believed that the formulation and aforesaid application of the prescribed water based composition in this invention is novel and inventive. In particular, styrene/butadiene latices are conventionally manufactured with rubber concentrations on an order of about 20 to about 35 weight percent elastomer. It is understood that concentrated styrene/butadiene latices containing the required 60 to about 72 weight percent elastomer are only practically prepared by fractionating or otherwise removing a portion of the water of the latex to increase the rubber concentration, and thus reduce its water concentration. It is understood that such latices with the substantial higher elastomer content are more conventionally used, for example, in the commercial preparation of foam rubber products.

It is considered herein that emulsion polymerization prepared polybutadiene latex having a conventional rubber content of about 40 to about 50 weight percent, or even up to 60 percent if available, of the elastomer is too dilute to be quantitatively practically useful in this invention unless it is used as an additive, or in addition, to the other latices for the coating composition or unless the concentration thereof in the latex is increased to above 60 percent unless the coating is applied to a hot rubber surface and/or external heating is applied.

The utilization of a nonionic or anionic water dispersion, as compared to a cationic dispersant derived dispersion, of the carbon black, is considered important for the carbon black dispersion to be compatible with the rubber latex as would be understood by one having skill in the rubber latex art.

In practice, it is considered important to add a wetting agent to facilitate a wetting of the unvulcanized rubber surface by the water based rubber coating composition. Usually about 1 to 3 phr of a wetting agent is used depending somewhat upon the composition of the unvulcanized rubber surface, including its oil content. Typically rubber surface compositions containing higher concentrations of rubber processing oil water based rubber coating compositions with higher concentrations of wetting agents in order to effectively wet the rubber surface. Such adaptation of use of wetting agents is understood to be understood known to those having skill in the coating art.

The term "latex" is used herein to indicate that the rubber emulsions are used as they have been produced or recovered without re-dissolving and re-emulsifying from a dry rubber.

It is considered that this electrical resistivity value is substantially lower than normal carbon black reinforced rubber compositions conventionally used for tire treads. It is therefore considered necessary to use electrically conductive carbon blacks for such purpose which will produce the aforesaid surface electrical resistivity of less that 10,000 ohms according to the ASTM Test D257-66, Mod G when mixed with sulfur curable rubber in an amount of 50 phr of carbon black and the rubber composition sulfur cured.

This maximum electrical resistivity for the cured coating is considered significant because the thin coating layer on the walls of the grooves of the tire tread is intended to be relied upon after the coating in the outer surface of the tread lugs has worn away.

It is considered herein that the aforesaid surface resistivity is predictive of the ability of the coating on the tire surface to dissipate electricity.

Indeed, such a rubber coating composition is considered herein to be desirable in many respects for a silica reinforced rubber tire tread composition which itself may have an electrical resistivity in a range of at least about 1,000,000,000 ohms according to said ASTM Test D257-66, Mod. G in order to provide a designed path for suitable electrical leakage, or dissipation, from the tire to the road.

In further accordance with this invention, method of preparing a rubber tire tread is provided which comprises the steps of (A) applying a coating of the water-based composition of this invention to an outer surface of a cap of an unvulcanized, sulfur curable rubber tire tread of a cap/base construction in a manner that the said coating also extends over and covers at a portion of an outer surface of the underlying tread base adjuxtapositioned to the said outer surface of the tread cap and (B) drying said coating; wherein said cap rubber contains about 40 to about 90 phr of silica and up to 10 phr of carbon black and said underlying base rubber contains, for example, about 30 to about 50 phr of carbon black and is thereby said to be carbon black reinforced.

The method is also contemplated where the outer surface of an unvulcanized tread stock, exclusive of surfaces to the tread stock which will contact other components of the tire construction is coated with the coating of this invention prior to building the tread stock into the tire construction.

In additional accordance with this invention, a pneumatic rubber tire is provided composed of (i) an outer, circumferential sulfur vulcanized rubber tread component configured with lugs and grooves which contains quantitative silica reinforcement in an amount of about 40 to about 90 phr and less than 10 phr of carbon black and (ii) a carcass component which is comprised of sulfur vulcanized carbon black reinforced rubber components containing at least about 40 phr of carbon black In further accordance with this invention, such a method of preparing a tire is provided where said tread is of a cap/base-wing construction where the wing of the said base extends laterally outward from the base and radially inward over the sidewall portion of the carcass of the tire and where said coating extends over and covers at least a portion of an outer surface of said base-wing adjuxtapositioned to the said outer surface of the said tread cap and is exclusive of the innerface between the tread base-wing and the tire carcass sidewall.

It is generally considered that the thin, dried and covulcanized coating of this invention has a thickness on the tire surface of less than about 0.005 cm.

By the term "covulcanized" it is meant that the coating composition is vulcanized together with the tire and thereby becomes integral therewith as opposed to being a simple laminate. The co-vulcanization may normally occur by autogenous vulcanization of the thin coating, after it is dried, via the free sulfur on the surface of the tire. Alternatively, curatives may be added to the coating composition as a water based dispersion thereof which may include sulfur cure accelerator(s) and/or sulfur.

In one aspect, the water based rubber composition of this invention can be suitably prepared, for example, by the steps of blending the latex, or latices, with the water dispersion of carbon black.

By emulsion polymerization prepared E-SBR, it is meant that styrene and 1,3-butadiene are copolymerized as an aqueous emulsion. Such are well known to those skilled in such art.

It is preferred that the emulsion polymerization prepared styrene/butadiene copolymer rubber (E-SBR) to have a medium to relatively low styrene content in a range, for example, of about 23 to about 35 percent bound styrene.

The cis 1,4-polyisoprene natural rubber is well known to those having skill in the rubber art.

In the practice of this invention, the carbon black reinforced overcoat for the quantitative silica reinforced rubber tread can be suitably applied to the tread, for example, by spraying or brushing.

Tire assembly is vulcanized in a suitable mold under conditions of elevated temperature, eg. in a range of about 150° to 180° C.

The accompanying drawings are provided for further understanding of the invention, although it is not intended that the invention be limited to the presentation of the drawings. In the drawings;

FIG. 1 is a cross-sectional, perspective view of an unvulcanized tire construction showing a coating of this invention applied over its tread component where the tread of a cap/base-wing construction.

FIG. 2 is a cross-sectional view of a vulcanized tire showing a tread with a cap/base-wing construction where the tread cap is of a lug and groove configuration together with a portion of a supporting carcass component together with a coating of this invention on the outer surfaces of the tread which specifically includes the walls of the tread groove.

FIGS. 3, 4 and 5 are cross-sectional, transverse views of various extruded, unvulcanized rectangular tread stock strip constructions showing the coating of this invention applied to their outer surfaces. In particular, FIG. 3 depicts a tread stock with a tread cap over a base-wing in which the wing is of the same rubber composition as the base, FIG. 4 depicts such a construction in which the wing is of a different rubber composition than the base and FIG depicts a similar construction in which the tread base does not have a wing.

FIG. 6 is a cross-sectional, perspective view of a vulcanized tire construction showing a tread cap/base-wing construction with the wings overlaying a portion of the sidewalls in the tread cap is configured with lugs and grooves, in which the grooves communicate with the shoulder region of the tire, together with a supporting carcass, and further showing the covulcanized coating of this invention over the surfaces of the tread, including the surfaces of the lugs and grooves and a portion of the aforesaid wings.

FIG. 7 also shows the tread of FIG. 6 with the coating worn away from a portion of the outer surface of the lugs of the tire in which the coating on the surfaces of walls of the grooves remains.

Referring to the drawings, a tire construction 1 is provided with a circumferential tread component composed of a tread cap 2 and tread base 6 construction in which the tread base 6 has a wing extension 17 which may be referred to herein as a base-wing. The tire has a carcass 3 which is composed of beads 5 encased with carbon black rubber, carbon black reinforced sidewalls 4 and supporting carcass plies 10 and belt 11.

The rubber tread cap 2 contains a quantitative amount of silica, namely about 65 phr, and a minimal amount of carbon black, namely about 6 phr.

The rubber tread base 6 and associated wing 17, if present, is carbon black reinforced with at least 40 phr of carbon black as is the sidewall rubber 4 and rubber for the bead 5.

A water based coating 7 containing an electrically conductive carbon black in an amount of 50 phr is applied to the surface of the tread cap 2 which extends over a portion of the outer surface of the tread base 6 or tread base-wing 17. If the tread is being pre-coated prior to being built onto a tire carcass, the coating 7 extends to a region on the tread base 6 or base-wing 17 which is exclusive of the surface thereof which is to be applied to the tire carcass.

The coating 7 is dried and the assembly of coated tread and carcass is vulcanized to form a tire with a tread configuration 18 having lugs 12 and grooves 13 with the covulcanized coating 7 being thereby integral with the walls and bottom of the grooves 13 and outer surface of the lugs 12. Indeed the coating thereon communicates directly with the shoulder region, and thereby the tread base or base-wing, as the case may be, to form an electrically conductive path from the tread to the bead area of the tire.

In one aspect, the coating 7 is worn away from the outer surface of the tread lugs 12 to leave the lugs 20 with associated grooves 13 which contain the covulcanized coating 7 on their walls and bottoms.

Alternatively, the coating 7 may be applied to an extruded, unvulcanized tread stock 14, 15 or 16 after which the coated tread stock is built into the tire construction 1 following which the assembly is vulcanized under conditions of elevated temperature and pressure to form a vulcanized tire.

In this manner a continuous path of diene-based elastomers is provided between the aforesaid coating 7 to the bead component 5 of the tire in which the bead component 5 is positioned in the tire construction to contact a metal rim in a tire/rim assembly, the tire/rim assembly itself not being shown.

In practice the coating 7 is applied as the aforesaid aqueous based composition and dried following which the assembly is vulcanized under suitable vulcanization conditions and the dried coating 7 becomes covulcanized the outer surface of the tread 2 of the tire construction.

Because the area of the coating presented to the ground is considered herein to be relatively minimal, particularly after it is worn away from the outer surface of the tire tread lugs, it is considered that for purposes of this invention of providing an electrical dissipation path it is important that the carbon black for the coating 7 be an electrical conductive type of carbon black.

Over a portion that will become the tread and over a portion that will become the mini-wings adjacent the tread is a coating of rubber which contains a quantitative amount of electrically conductive carbon black.

It is important that the coating is exclusive of the portion of the rubber extrusion which will come in contact with other portions of the tire construction when the tread stock is built into the tire construction. This aspect is to prevent the coating from interfering with adhesion of the various components to the tread upon vulcanizing the tire construction.

The tire construction, with the coated tread stock, is shaped and vulcanized in a suitable mold to form a tire having a tread configured with what is referred to herein lugs and grooves. The said coating, which becomes covulcanized with the tire, covers the outer surface of the lugs and the walls and bottoms of the grooves and extends to the carbon black reinforced rubber of the said wings which are now located in the shoulder region of the tire between the tread and sidewalls.

As the tire, having been mounted and inflated on a suitable rigid metal rim on a vehicle, rolls across the ground, a path for electrical leakage, or dissipation, is created between the tread, and thereby the ground, and shoulder portions of the tire by the aforesaid electrically conductive coating.

As the coating on the outer, ground-contacting, surfaces of the tread lugs wears away, an electrical path between the ground and shoulder of the tire is maintained by the coating on the walls of the tread grooves as a groove path extends to the said shoulder portions of the tire.

In the practice of this invention, sulfur vulcanizable elastomers are contemplated for the tread, including its cap and base, or base-wing, as well as the carcass rubber with which the tread base, or base-wing contacts. While selection of the rubber is not considered critical for the basic operation of this invention, diene-based elastomers are directly contemplated with their carbon-to-carbon double bonds being available for sulfur curing, or vulcanization. Representative of various sulfur curable elastomers for such use, but illustrated here only as examples which are not intended to be exhaustive, are natural cis 1,4-polyisoprene rubber and synthetic polymers and copolymers of dienes such as isoprene and butadiene, including polyisoprene, polybutadiene and isoprene/butadiene copolymers and copolymers thereof with aromatic vinyl compounds such as, for example, styrene and alpha methyl styrene representative of which are styrene/butadiene copolymers, whether prepared by organic solution or by aqueous emulsion polymerization. Such elastomers are known for use in the preparation of tires.

The commonly employed siliceous pigments used in rubber compounding applications are usually precipitated siliceous pigments (referred to herein as silica).

The siliceous pigments employed may be precipitated silicas such as, for example, those obtained by the acidification of a soluble silicate, e.g., sodium silicate.

The BET surface area of the silica, as measured using nitrogen gas, may, for example, be a range of about 50 to about 300, alternatively about 120 to about 200, square meters per gram. A BET method of measuring surface area is described in the *Journal of the American Chemical Society,* Volume 60, page 304 (1930).

The silica may also have a dibutylphthalate (DBP) absorption value, for example, in a range of about 100 to about 400, and usually, as it is understood, about 150 to about 300.

Various commercially available silicas may be considered for use in this invention such as, for example only and without limitation, silicas commercially available from PPG Industries under the Hi-Sil trademark with designations 210, 243, etc; silicas available from Rhone-Poulenc, with designations of Z1165MP and Z165GR and silicas available from Degussa AG with, for example, designations VN2 and VN3, etc.

When quantitative silica reinforcement is used for a rubber tire tread, the silica is conventionally used with a coupling agent, or what is sometimes referred to as a reinforcing agent.

Compounds capable of reacting with both the silica surface and the rubber elastomer molecule, in a manner to cause the silica to have a reinforcing effect on the rubber, many of which are generally known to those skilled in such art as coupling agents, or couplers, are often used. Such coupling agents, for example, may be premixed, or prereacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber, such as for example, silane coupling agents containing a polysulfide component, or structure, such as bis-(3-triethoxysilylpropyl) tetrasulfide.

It is readily understood by those having skill in the art that the rubber composition of the tread rubber as well as the carcass rubbers would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, although not expected to be used in the tread rubber utilized in the practice of this invention, may comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants, if used, comprise about 1 to 5 phr. Typical amounts of fatty acids or metal salts thereof, whichever might be used, which can be for example stearic acid and/or zinc stearate, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers, if used, would be expected to comprise about 0.1 to about 0.3 phr. Typical peptizers may be, for example, pentachlorothiophenol and dibenzamidodiphenyl disulfide.

Vulcanization of rubber in general terms is often conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are generally used for sulfur vulcanizable rubber compositions in an amount ranging from about 0.5 to about 4 phr, or even, in some circumstances, up to about 8 phr, with a range of from about 1.5 to about 2.5, sometimes from 2 to 2.5, being preferred.

Accelerators are generally used for many sulfur vulcanizable rubber compositions to control the time and/or temperature required for vulcanization and to improve the properties of the vulcanizate. Retarders might also be used to control a rate of vulcanization. For example, in some situations for vulcanizing sulfur vulcanizable rubber compositions, a single accelerator system may be used, i.e., primary accelerator. When a vulcanization accelerator is used, conventionally a primary accelerator(s) is used in total amounts ranging, for example, of from about 0.5 to about 4, preferably about 0.8 to about 1.5, phr. In another embodiment, combinations of a primary or and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators might sometimes be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

However, as herein discussed, the presence and relative amounts of the above additives, if any, are not considered to be a significant aspect of the present invention, except where otherwise referenced, which is more primarily directed to the application of prescribed coatings onto surfaces of quantitatively silica reinforced rubber tire treads, particularly where an autogenous sulfur curing of the coating on the rubber surface is relied upon.

The tire can be built, shaped, molded and cured by various methods which will be readily apparent to those having skill in such art.

The invention may be better understood by reference to the following examples in which the parts and percentages are by weight unless otherwise indicated.

EXAMPLE I

A modified ASTM Method D257-66 is used for measuring surface resistivity of rubber compositions which contain carbon black and/or silica. The modification of the ASTM procedure used herein consisted essentially of modifying the voltage of the ASTM method by reducing it from 500 volts to 0.1 volts to accommodate a measurement of the very low surface resistivity of coated rubber samples. This modified ASTM method is referred to herein as ASTM D257-66, Mod. G. The Mod. G is not an official ASTM designation, has not been submitted to any ASTM committee for review and only refers to the aforesaid modification as used herein.

Sample preparation and relative voltages used for ASTM D257-66, Mod. G are illustrated as follows in the following Table 1 and Table 2.

A. Instrumentation

For the measurements made herein, the following instrumentation was used from Keithley Instruments, Inc. of Cleveland, Ohio, USA:

1) Model 6105 Resistivity Adapter
2) Model 487 Pico Ammeter/Source, a regulated voltage supply, adjustable from about 1 millivolt to 505 volts.

For surface resistivity measurements, discs of vulcanized rubber compositions are used having a diameter of 10.2 cm and a thickness of about 0.2, with the thickness being slightly greater, namely about 0.002 to about 0.005 cm greater, for the coated discs to be prepared as hereinafter described.

The surface resistivity is calculated by a formula which can be represented as:

$$x = (P/g)(R)$$

where

1) R is the surface electrical resistance, in ohms, measured as specified in the ASTM D257-66 procedure
2) P is the effective perimeter of the guarded electrode for the particular electrode arrangement employed, or 5.4 inches times pi (13.7 cm times pi)
3) g is the distance between the electrodes, or 0.125 inches (0.32 cm)

For the aforesaid Model 6105, which uses circular electrodes, P/g is represented as 53.4.

Upon appropriately placing the test sample within Model 6105 instrument and application of appropriate power supply voltages, the current is read on the instrument's electrometer and the value of the surface resistivity is found through the following calculation:

$$R = (53.4/I)(V)$$

where

1) R is the surface resistivity of the sample
2) V is the applied voltage from the poser supply in volts, or millivolts
3) I is the current reading from the electrometer

B. Sample Preparation

Rubber compositions were prepared with carbon black reinforcement and with silica reinforcement. The ingredients for the compositions were mixed in two stages, namely a first stage for the basic ingredients followed by a second stage for the curatives. Such mixing procedure is well known to those having skill in the rubber mixing art. In the first stage, the ingredients were mixed in a rubber mixer for about 3 minutes to a temperature of about 160°–170° C. following the mixture was removed from the mixer and allowed to cool to about 25° C. For the second stage the mixture, together with curative ingredients where then mixed in a rubber mixer for about 1.5 minutes to a temperature of about 110° C. after which the final mixture, or composition, was removed from the mixer and allowed to cool to about 25° C. The resulting composition was vulcanized under conditions of elevated temperatures of about 150° C. for about 18 minutes for the carbon black reinforced and silica reinforced rubber compositions. The rubber compositions, for the purposes of this Example are identified as composition Exp X for the carbon black reinforced rubber and composition Exp Y for the silica reinforced rubber. The respective compositions were comprised of the materials as shown in the following Table 1.

TABLE 1

| | Parts | |
|---|---|---|
| Material | Exp X | Exp Y |
| Stage One | | |
| Polybutadiene[1] | 25 | 25 |
| E-SBR[2] | 103.13 | 103.13 |
| Carbon black (N299) | 50 | 0 |
| Silica[3] | 0 | 50 |
| Silica coupler[4] | 0 | 7.1 |
| Additional Oil[5] | 10 | 10 |
| Stearic acid | 2 | 2 |
| Waxes[6] | 3 | 3 |
| Antioxidant[7] | 2 | 2 |
| Stage Two | | |
| Zinc oxide | 3 | 3 |
| Sulfur | 1.5 | 1.5 |
| TMTD[8] | 0.2 | 0.4 |
| Sulfenamide accelerator | 1 | 1.2 |

[1]Cis 1,4-polybutadiene elastomer available as Budene 1207 from The Goodyear Tire & Rubber Company
[2]Emulsion polymerization prepared styrene/butadiene copolymer elastomer with 23.5 percent bound styrene and containing 28.13 parts rubber processing oil, and thus 75 parts E-SBR, available as Plioflex 1712 from The Goodyear Tire & Rubber Company
[3]A silica identified as Z1165MP from Rhone-Poulenc
[4]A mixture of bis-(3-ethoxysilylpropyl) tetrasulfide and carbon black in a 50/50 ratio as X50S from Degussa
[5]Aromatic rubber processing oil
[6]Mixture of microcrystalline waxes
[7]Antioxidant of the para phenylene diamine type
[8]Tetramethyl thiuram disulfide accelerator

C. Water Based Rubber Coating Compositions

Water based rubber compositions containing electrically conductive carbon black were prepared which contained quantitative amounts of electrically conductive carbon black. The water based compositions were prepared by blending aqueous latex emulsions with a water dispersion of electrically conductive carbon black.

One surface of unvulcanized sample discs of the aforesaid silica reinforced rubber formulation Y was coated with the water based rubber compositions containing the electrically conductive carbon black by brushing.

The coated discs were vulcanized at a temperature of about 150° C. for about 18 minutes. It is considered herein that the coatings co-vulcanized with the compositions. The coatings were considered to have an estimated a thickness of about 0.002 to about 0.005 cm.

The water based rubber coating compositions containing the electrically conductive carbon black were comprised of the materials, or ingredients, shown in the following Table 2. About one phr of a wetting agent was used in the formulation as Surfynol 465 epoxylated tetramethyldecylnediol from Air Products.

TABLE 2

| Material | Exp A | Exp B | Exp C | Exp D | Exp E | Exp F |
|---|---|---|---|---|---|---|
| NR Latex[1] | 100 | 100 | 100 | 0 | 0 | 0 |
| E-SBR Latex[2] | 0 | 0 | 0 | 100 | 100 | 100 |
| CB[3] Dispersion | 100 | 200 | 50 | 100 | 200 | 50 |

[1]Natural rubber latex (cis 1,4-polyisoprene) with a rubber content of about 60 weight percent and having a pH of about 10.8.

TABLE 2-continued

| Material | Exp A | Exp B | Exp C | Exp D | Exp E | Exp F |
|---|---|---|---|---|---|---|

[2]Emulsion polymerization prepared styrene/butadiene copolymer elastomer latex with an elastomer content of about 70 weight percent and where the copolymer contains about 23 percent of bond styrene and having a pH of about 10.5 available as LPF 5356 from The Goodyear Tire & Rubber Company;
[3]A carbon black/water dispersion containing about 20 weight percent carbon black and having a pH of about 9 and available as AQUABLAK 320 from Borden Chemicals as an electrically conductive carbon black dispersion.

The measured surface resistances of the X and Y samples and the aforesaid coated composition Y samples (discs) according to ASTM D257-66, with adjusted voltages, samples are shown in Table 3.

Because of the extremely low surface resistivity experienced, it was necessary to lower the voltage to as low as 0.5 volts, and even as low as 0.1 volts, so that the ammeter of the instrument would not be overloaded.

Note that the aforesaid ASTM D257-66, Mod. G. uses the prescribed voltage of 0.1 volts.

TABLE 3

| Voltage Applied | Surface Resistivity | | | | | |
|---|---|---|---|---|---|---|
| A. Uncoated Samples | Exp X $10^6$ Ohms | Exp Y $10^{10}$ Ohms | | | | |
| 0.10 volts | 9 | 40 | | | | |
| 0.5 volts | 5.5 | 380 | | | | |
| 1.0 volts | 4 | 140 | | | | |
| B. Coated | Surface Resistivity ($10^3$ Ohms) | | | | | |
| Samples | Exp A | Exp B | Exp C | Exp D | Exp E | Exp F |
| 0.1 volts | 0.2 | 0.7 | 0.3 | 0.6 | 0.8 | 2.5 |
| 0.5 volts | OL[1] | 0.6 | 0.3 | 0.7 | 0.8 | |
| 1.0 volts | OL[1] | 0.6 | OL[1] | 0.7 | 0.1 | |

[1]OL simply means that the milliammeter of the instrument was overloaded.

It is considered herein that these examples demonstrate a suitable electrical path can be formed on a relatively insulative silica reinforced rubber surface by application of the coating used in this invention composed of a blend of rubber latex and electrically conductive carbon black. It is further considered that these examples demonstrate that such a coating can be applied, with a suitable drying time, in the preparation of tire with tread composed of an insulative silica reinforced tread to create a suitable electrical path for dissipating electrical energy from the tire to the ground.

ADDITIONAL DISCLOSURE AND PRACTICE OF THE INVENTION

As hereinbefore set forth, "For the purposes of this invention, electrically conductive carbon blacks are those which, when blended in an amount of 50 phr with a diene-based elastomer such as, for example, emulsion polymerization prepared styrene/butadiene copolymer, and the resulting mixture sulfur cured, provide a composition demonstrating a surface electrical resistance of 10,000 ohms or less according to ASTM D257-66, Mod G, as hereinafter described."

As also hereinbefore set forth, "it is considered herein that carbon black reinforced rubber of a tire carcass and associated tread normally provide a continuous path to dissipate electrical energy and thereby retard or eliminate astatic electrical charge from building up and/or accumulating under dynamic conditions of a rotating tire on a vehicle traveling across the ground."

However, for reasons hereinbefore set forth, it is desired that carbon blacks used in this invention be particularly electrically conductive and, therefore, be differentiated from more conventional reinforcing carbon blacks used for rubber tire treads.

Accordingly, the above test is prescribed to define an electrical resistance characteristic for the desired carbon blacks for use in this invention in terms of the aforesaid ASTM D257-66, Mod G.

Therefore, it is reemphasized that the criteria for qualifying the electrically conductive carbon black for use in this invention of 10,000 ohms or less is the hereinbefore presented ASTM D257-66, Mod G test. Adequate basis for such requirement may be found in the reported results of Example I, in which (i) a silica reinforced rubber as Exp Y of Table 1 is coated with coating Exp E of Table 2. Coating E of Table 2 is composed of a mixture of E-SBR latex (reported in the table as a dry weight of 100 parts) and carbon black dispersion (reported in the table as a dry weight of 100 parts which is now reported herein as being composed as 95 parts carbon black and about 5 parts of dispersing agent). In Table 3, at the prescribed application of 0.1 volts by the ASTM D257-66, Mod G, the uncoated sample (EXP Y) exhibited a resistance of 400,000,000,000 ohms and the coated sample E exhibited an electrical resistance of 2,500 ohms, thereby qualifying the carbon black utilized for the Exp E coating as a suitable electrically conductive carbon black for use in this invention. The coating of the sample Exp E was sulfur cured by being co-cured with the rubber sample Exp Y and thereby being autogeneously sulfur cured by the naturally occurring free sulfur at, or on, the surface of the sample Exp Y.

In order to clarify the qualification requirements for carbon blacks considered herein to be suitable for use in this invention, and for the purposes of this invention, electrically conductive carbon blacks are those which, when blended as a carbon black aqueous dispersion in an amount of 50 parts dry carbon black with an emulsion polymerization prepared styrene/butadiene elastomer latex in amount of 100 parts dry elastomer (particularly as demonstrated in Table 4) and dried and sulfur cured (particularly autogeneously cured by application to a sulfur-containing rubber composition such as, for example, the sample EXP Y of Example I and co-cured therewith) provides a composition demonstrating a surface electrical resistance of 10,000 ohms or less, and preferably 5,000 ohms or less, according to ASTM D257-66, Mod G, as hereinbefore described. This sample preparation for the carbon black qualification is hereby incorporated into and made a part of the aforesaid ASTM D257-66, Mod G for carbon black qualification as an electrically conductive carbon black for the purposes of this invention.

TABLE 4

| Material | Dry Parts |
|---|---|
| E-SBR Latex[1] | 100 |
| Carbon Black[2] | 50 |

[1]Emulsion polymerization prepared styrene/butadiene copolymer elastomer latex with an elastomer content of about 70 weight percent and where the copolymer contains about 23 percent of bond styrene and having a pH of about 10.5 available as LPF 5356 from The Goodyear Tire & Rubber Company;

TABLE 4-continued

| Material | Dry Parts |
|---|---|

[2] A carbon black/water dispersion is used and the reported dry carbon black may be composed of 95 weight percent carbon black and about 5 parts by weight dispersing aid.

Therefore, and in accordance with this invention, the aforesaid water-based rubber composition for use in this invention is provided which comprises a blend of (A) at least one aqueous rubber latex selected from emulsion polymerization prepared styrene/butadiene copolymer rubber latex, emulsion polymerization prepared polybutadiene latex and natural rubber cis 1,4-polyisoprene latex and (B) an aqueous dispersion of electrically conductive carbon black, wherein said carbon black is present in an amount of about 25 to about 200 phr and where said rubber/carbon black composition, when dried and sulfur cured, is characterized by having a surface resistivity of less than about 10,000 ohms according to ASTM Test D257-66, Mod. G and wherein said carbon black is characterized by the carbon black characterization aspect of ASTM Test D257-66, Mod G.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing an unvulcanized tire comprised of an outer, circumferential rubber tire tread of a cap/base construction and a supporting rubber carcass, said carcass rubber and said tread rubber containing at least 40 phr of carbon black; wherein the rubber of said tread cap contains about 40 to about 90 phr of silica and up to about 10 phr of carbon black and is characterized by having an electrical resistivity of at least 1,000,000 ohms according to ASTM Test No. D257-66, Mod. G; and wherein said method comprises (i) coating said tread cap with a water based composition and drying said composition to provide a coating thereon following by (ii) co-vulcanizing said tire and coating to provide such coating having an electrical resistivity; wherein said electrical resistivity is less than 10,000 ohms; wherein said coating extends to and contacts at least one of said carcass rubber and said tread base rubber; wherein said water-based rubber composition comprises a blend of (A) at least one aqueous rubber latex selected from the group consisting of emulsion polymerization prepared styrene/butadiene copolymer rubber latex, emulsion polymerization prepared polybutadiene latex and natural rubber cis 1,4-polyisoprene latex and (B) an aqueous dispersion of electrically conductive carbon black, wherein said carbon black is present in an amount of about 25 to about 200 phr of said coating composition.

2. A tire prepared by the method of claim 1.

* * * * *